(12) United States Patent
Terhaar (10) Patent No.: US 8,297,408 B2
(45) Date of Patent: Oct. 30, 2012

(54) MAGNETIC STABILIZER FOR MATERIAL HANDLING EQUIPMENT

(76) Inventor: David J. Terhaar, Holland, MI (US)

( * ) Notice: Subject to any disclaimer, the term of this patent is extended or adjusted under 35 U.S.C. 154(b) by 1000 days.

(21) Appl. No.: 12/315,484

(22) Filed: Dec. 3, 2008

(65) Prior Publication Data

US 2010/0133049 A1    Jun. 3, 2010

(51) Int. Cl.
*B66F 9/06*   (2006.01)
*B62D 49/06*  (2006.01)
*B60S 9/02*   (2006.01)
*B60T 1/14*   (2006.01)

(52) U.S. Cl. .......... 187/232; 188/7; 280/763.1; 180/313

(58) Field of Classification Search .......... 187/222, 187/231, 232; 180/13, 211, 213, 216, 217, 180/253, 19.1–19.3; 414/480, 631, 663, 414/664, 668; 254/2 B, 9 B, 8 B; 188/7, 188/267, 313, 266; 74/519; 280/763.1, 764.2; B66F 9/06, 9/075, 9/065, 9/16

See application file for complete search history.

(56) References Cited

U.S. PATENT DOCUMENTS

| | | | | |
|---|---|---|---|---|
| 2,236,281 A * | 3/1941 | Anderson | ........................... | 188/5 |
| 2,851,126 A * | 9/1958 | Ward, Jr. | ........................... | 188/5 |
| 2,922,494 A * | 1/1960 | Clark, Jr. | ........................... | 188/5 |
| 3,554,328 A * | 1/1971 | Jones | ................................ | 188/5 |
| 3,767,226 A * | 10/1973 | Stephens | .................... | 280/764.1 |
| 4,244,599 A * | 1/1981 | Gauchet | ..................... | 280/764.1 |
| 6,505,359 B2 * | 1/2003 | Heimbrock et al. | ............. | 5/86.1 |
| 7,101,139 B1 * | 9/2006 | Benedict | ....................... | 414/281 |
| 2004/0105733 A1 * | 6/2004 | Hewitt | ............................ | 410/66 |
| 2008/0136133 A1 * | 6/2008 | Takahashi | ................... | 280/79.2 |

* cited by examiner

*Primary Examiner* — Michael Mansen
*Assistant Examiner* — Stefan Kruer
(74) *Attorney, Agent, or Firm* — Flynn, Thiel, Boutell & Tanis, P.C.

(57) ABSTRACT

A stabilizer for material handling equipment, includes a base mount for mounting to the material handling equipment, a main frame pivotally attached to the base mount, and a release lever and magnet housing pivotally mounted to the main frame. A biasing element holds the main frame in a disengaged position away from a metallic floor surface. The release lever can be addressed by a user to overcome the biasing element and rotate the magnet housing to an engaged position, so that magnets in the magnet housing engage the metallic floor surface, holding or anchoring the material handling equipment in place. In order to disengage the magnets from the metallic floor surface, the user forces the release lever in an opposite direction, prying the magnets from the floor surface, upon which the biasing element further rotates the main frame, removing the magnet housing from the proximity of the floor.

9 Claims, 8 Drawing Sheets

MAGNETIC STABILIZER FOR MATERIAL HANDLING EQUIPMENT

FIELD OF THE INVENTION

The invention relates to a stabilizer for material handling equipment, specifically a magnetic hold down for mobile material handling equipment, such as a two-wheeled hand truck, appliance truck, portable pallet jack, platform truck, dolly or mobile table.

BACKGROUND OF THE INVENTION

It is common practice for goods to be moved into and out of cargo vehicles, such as box trucks or trailers, in a palletized configuration. It is advantageous to palletize goods for creating uniform articles for packing within the cargo van. It is also advantageous to palletize goods because the goods can be loaded in a more expeditious manner than loose goods. However, the palletized goods generally weigh more than can be moved by hand, and it is cost prohibitive to provide wheeled carts for each collection of goods.

The pallet, that can be moved by a pallet jack or forklift, is the most practical means of packing and loading and unloading cargo. Portable hydraulic pallet jacks are also of such a size that one can be carried within the cargo van for loading and unloading goods at locations that do not possess their own pallet jack or forklift. During transport, however, the pallet jack must be secured to prevent movement within the cargo van. Such movement would potentially damage the goods being transported, the cargo van, or the pallet jack itself. Conventionally, the pallet jack can be strapped to securing points on the walls of the cargo van or, in some cases, the pallet jack is inverted or laid on its side to prevent it from rolling on the included wheels. This does not always work to the best effect however, as the pallet jack can still slide within the cargo van, causing damage.

In a fully loaded cargo bay, it also occurs that there is limited space for storage of the pallet jack, and the pallet jack is stored at least partially inserted into one of the cargo pallets so that the pallet jack must remain in an upright position, but no means of adequately securing the pallet jack are available.

It would be advantageous to provide a means of securing a pallet jack within a cargo space. Such means would be readily accessible to the user, without requiring access to all sides of the pallet jack, and would keep the pallet jack in the upright position. Such means would also not require access to special tie-down points within the cargo van but would be configured to secure the pallet jack at any location in the cargo van.

SUMMARY OF THE INVENTION

A stabilizer for releasably anchoring material handling equipment, includes a base mount for mounting to the material handling equipment, a main frame pivotally attached to the base mount, and a release lever and magnet housing pivotally mounted to the main frame. A biasing element holds the main frame in a disengaged position away from a metallic floor surface such as a floor of a truck. The release lever can be addressed by a user to overcome the biasing element and rotate the magnet housing to an engaged position, so that magnets in the magnet housing engage the metallic floor surface, holding the material handling equipment in place and preventing movement of the material handling equipment. In order to disengage the magnets from the metallic floor surface, the user forces the release lever in an opposite direction, prying the magnets from the floor surface, upon which the biasing element further rotates the main frame, removing the magnet housing from the proximity of the floor. The material handling equipment is then freed for use in loading and unloading of pallets and the like.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION OF THE INVENTION

Figure 1:
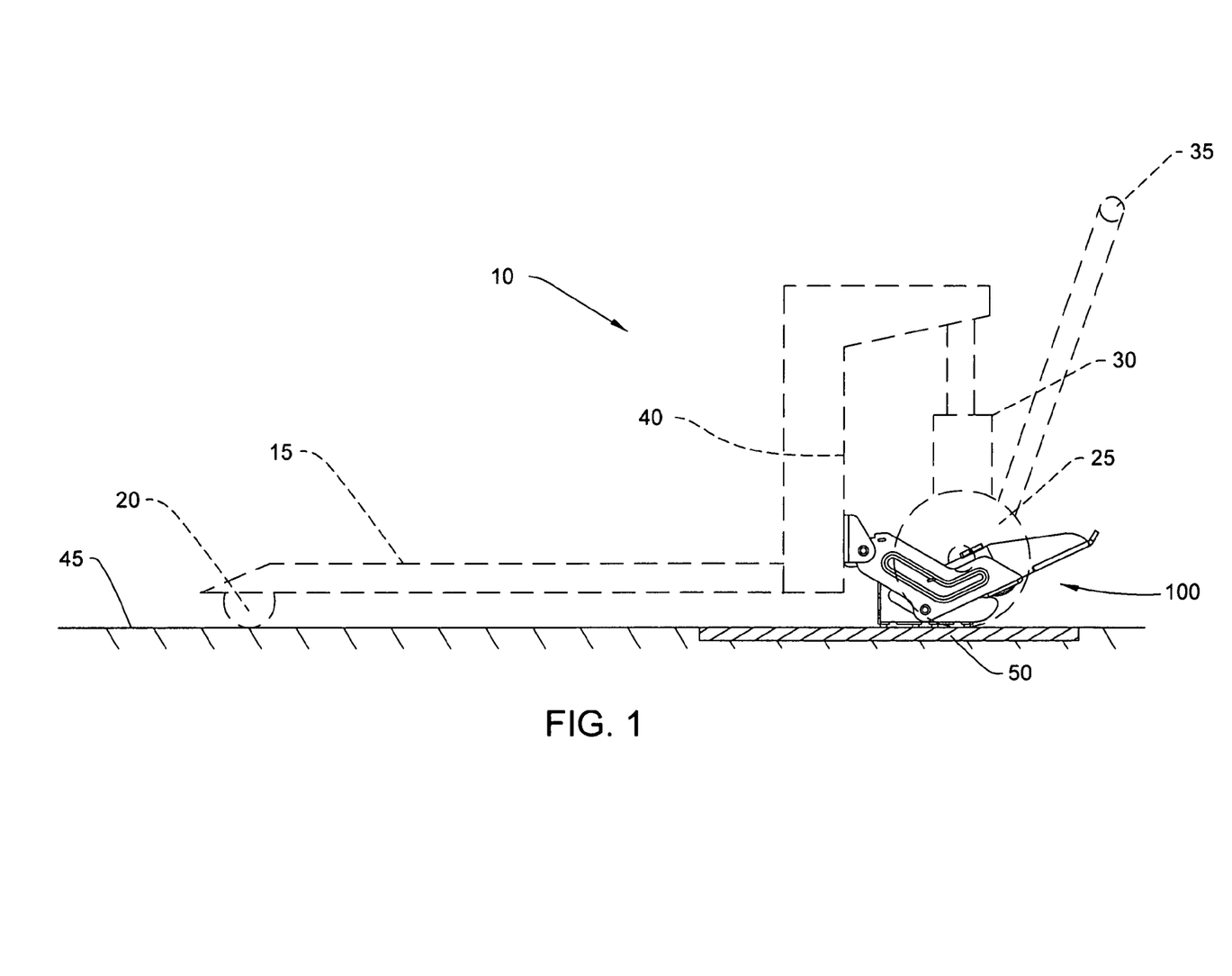
FIG. 1 is a side view of a magnetic stabilizer according to the invention mounted on a pallet jack and deployed in a floor-engaging position.

FIG. 1 is a schematic side view of a pallet jack 10 positioned on a floor surface 45 having an embedded metallic plate 50; such a plate could also be secured by fasteners to be substantially flush with the floor surface 45. The floor surface 45 could be any suitable surface of a storage area such as the metal floor of a truck, storage container or other storage and shipping unit. The pallet jack 10 is conventionally used for loading and unloading of articles, such as pallets, from the storage area.

Front fork tines 15 of the pallet jack 10 are supported by forward rollers 20. A rearward frame portion 40 of the pallet jack 10 is supported by wheels 25 and a hydraulic lift mechanism 30. The pallet jack 10 is manually moved by a handle 35 which is also used to control the hydraulic mechanism 30. A magnetic stabilizer 100 according to the invention is mounted to the rearward frame portion 40 of the pallet jack 10 to releasably anchor the pallet jack 10 to the floor surface 45. It will be understood that the stabilizer 100 of the invention is also usable with other types of material handling equipment.

Figure 2:
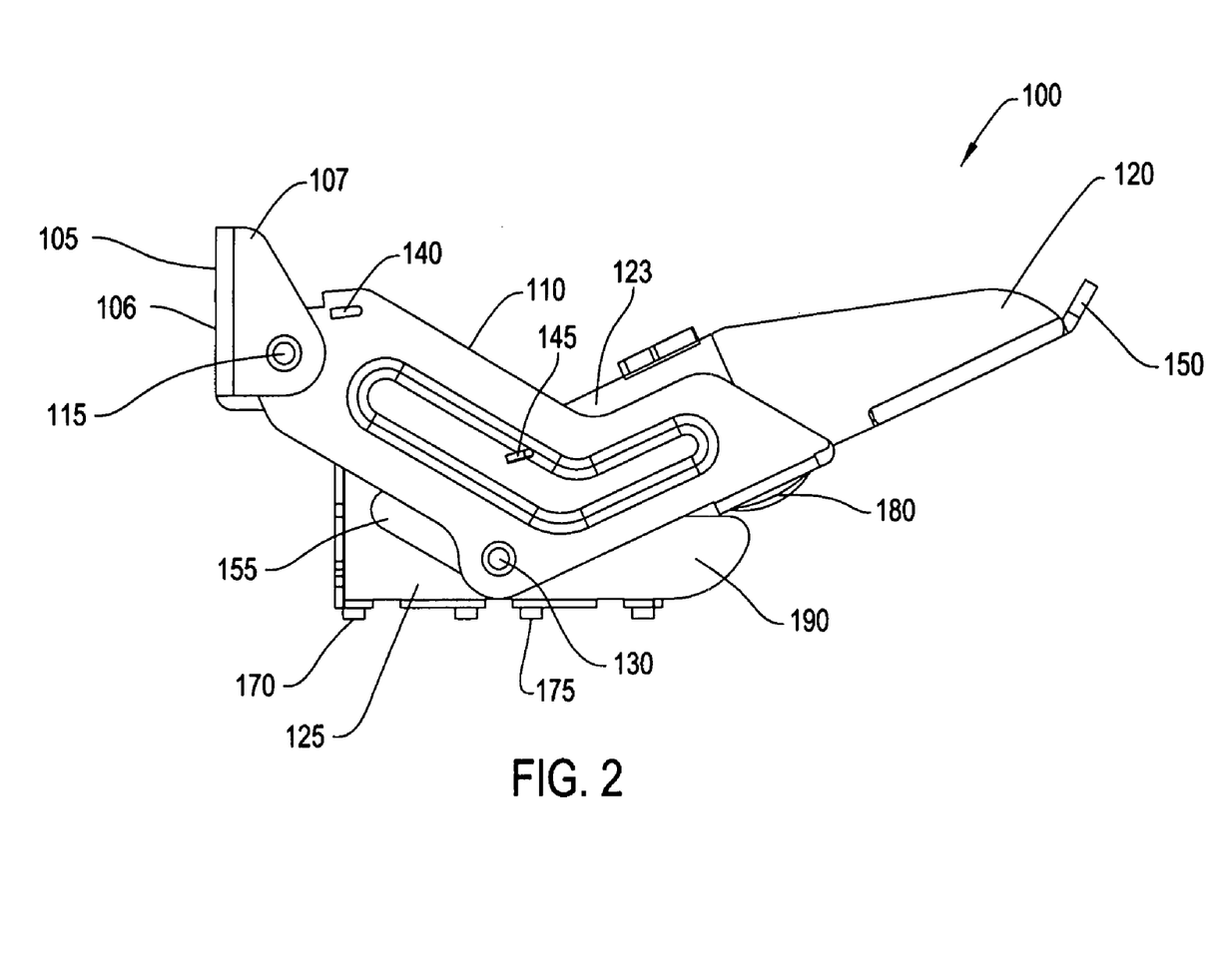
FIG. 2 is a side view of the magnetic stabilizer of FIG. 1.
Figure 5:
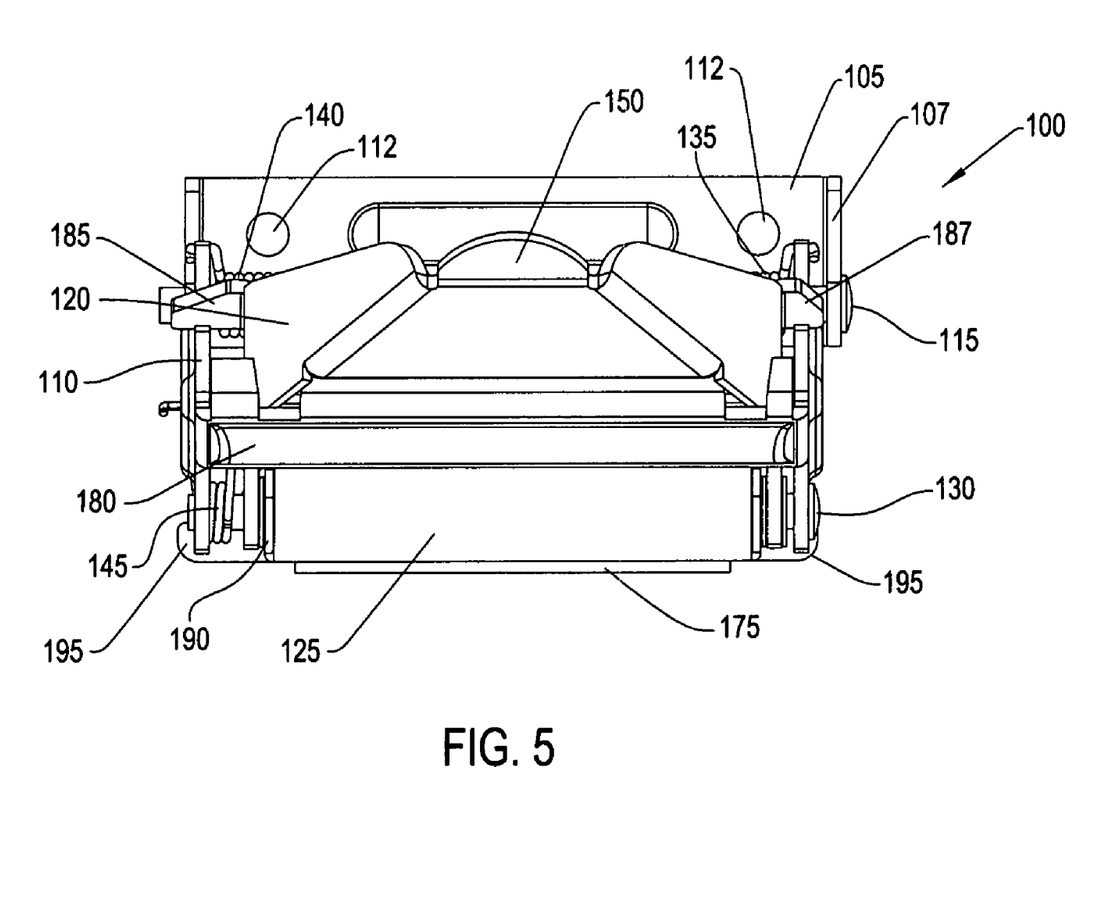
FIG. 5 is a front view of the magnetic stabilizer of FIGS. 1-4.
Figure 6:
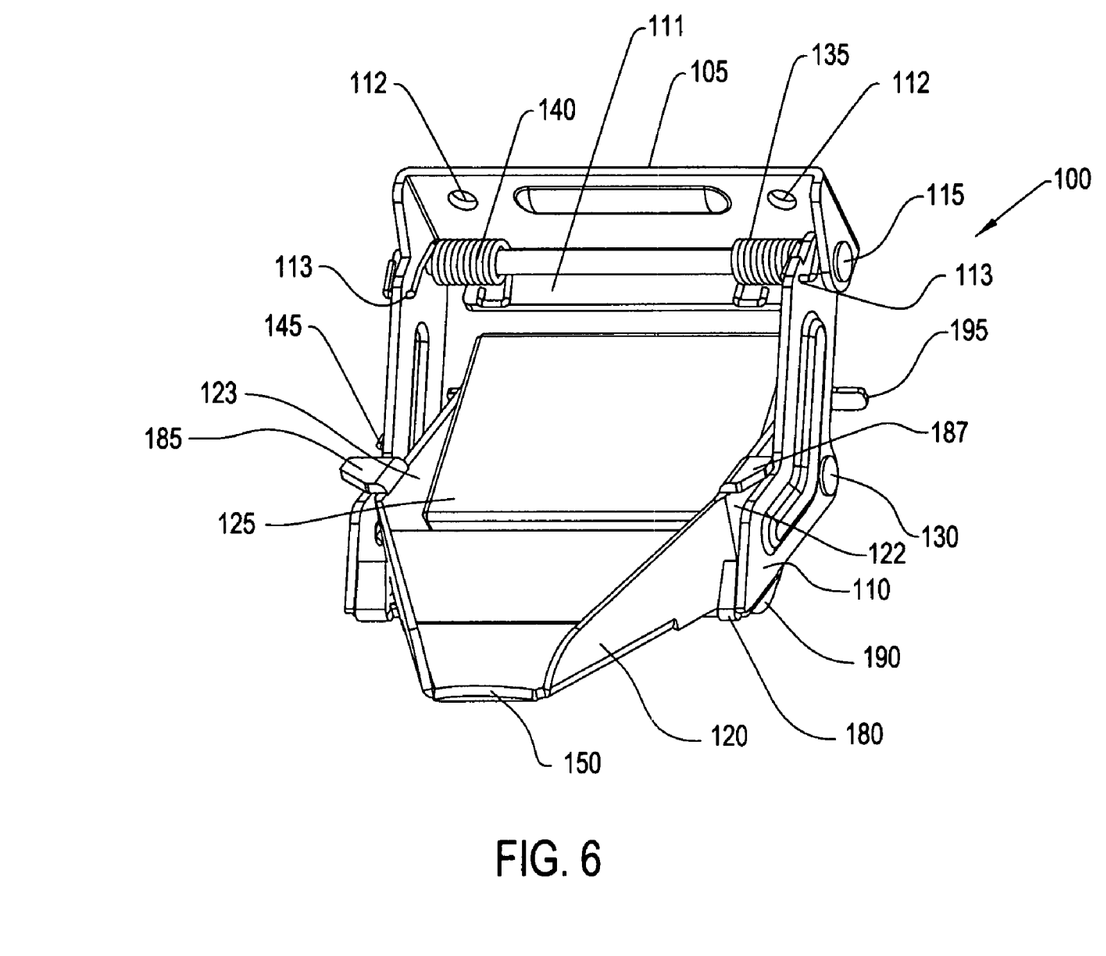
FIG. 6 is a perspective view of the magnetic stabilizer of FIGS. 1-5.
Figure 7:
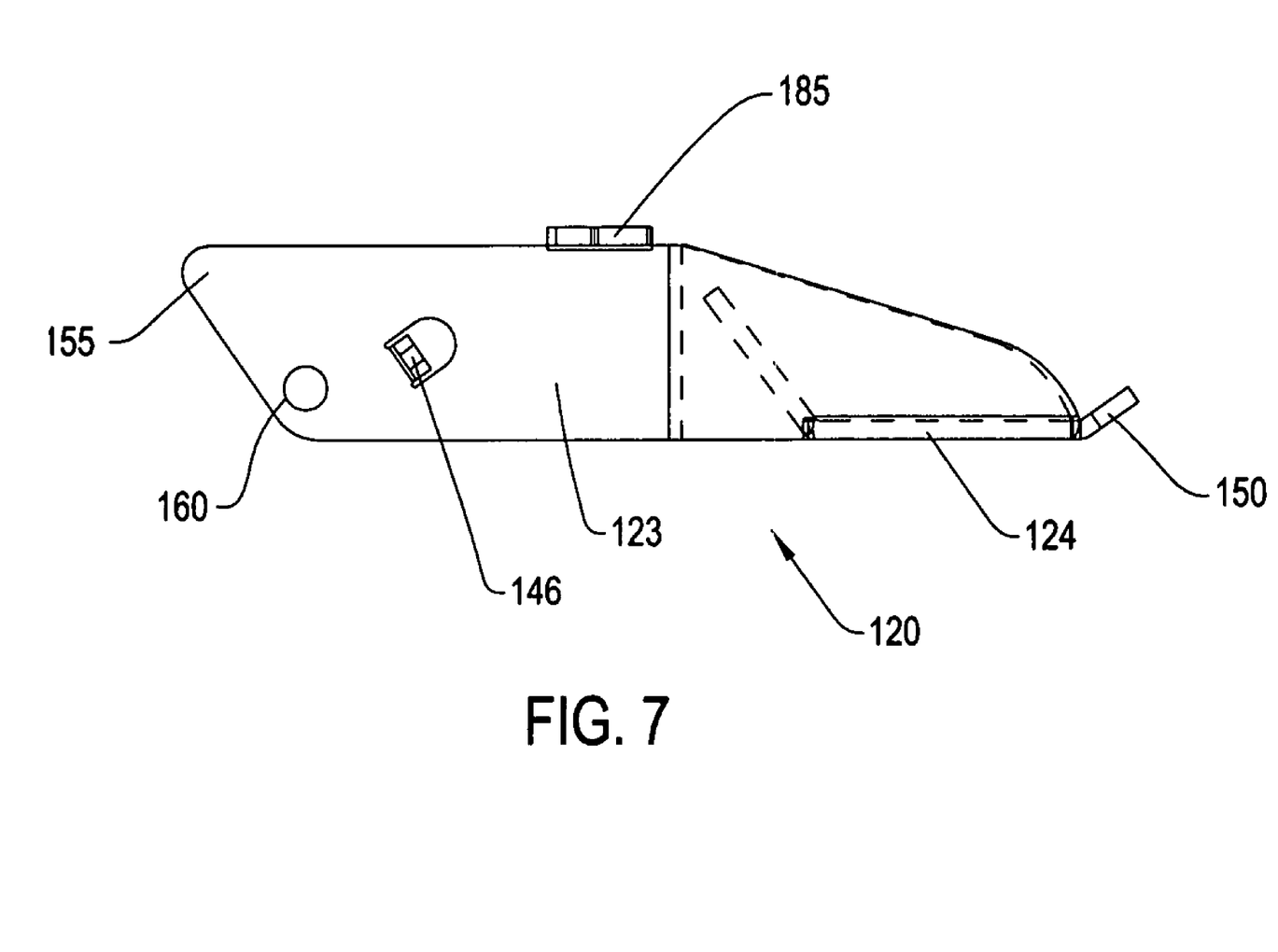
FIG. 7 is a side view of a release lever of the magnetic stabilizer of FIGS. 1-6.

Referring to FIG. 2, the magnetic stabilizer 100 is constructed of four major components. A U-shaped frame mount 105 is configured with an L-shaped back plate 106 for mounting to the rearward frame portion 40 of the pallet jack 10 by fasteners (not shown) through apertures 112 (FIG. 5). Ears 107, 109 extend from the back plate 106. A main frame 110 is pivotally mounted to the frame mount 105 by a frame mount pin 115 passing through apertures 108 in the ears 107, 109. A release lever 120 and a magnet housing 125 are pivotally mounted to the main frame 110 with a main frame pin 130 wherein the magnet housing 125 allows for anchoring of the stabilizer 100 to the floor surface 45 while the release lever 120 is manually actuatable to release the magnet housing 125 to permit movement of the pallet jack 10.

Figure 3:
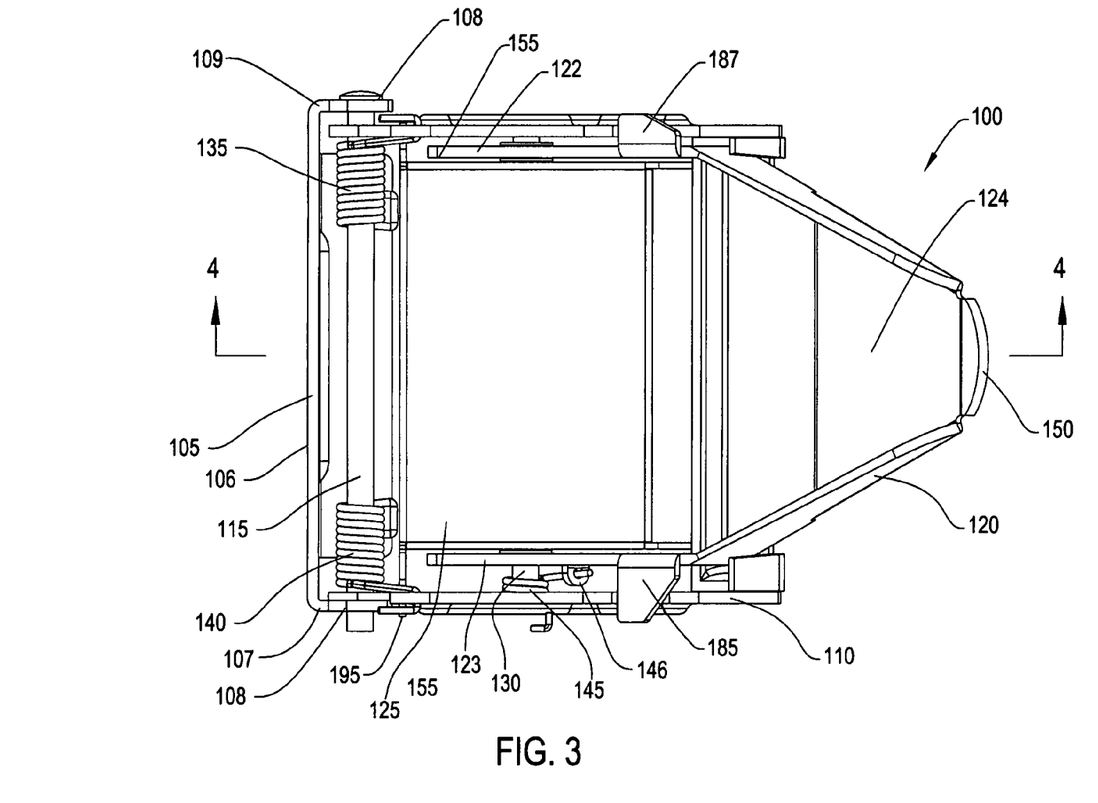
FIG. 3 is a top view of the magnetic stabilizer of FIGS. 1-2.
Figure 4:
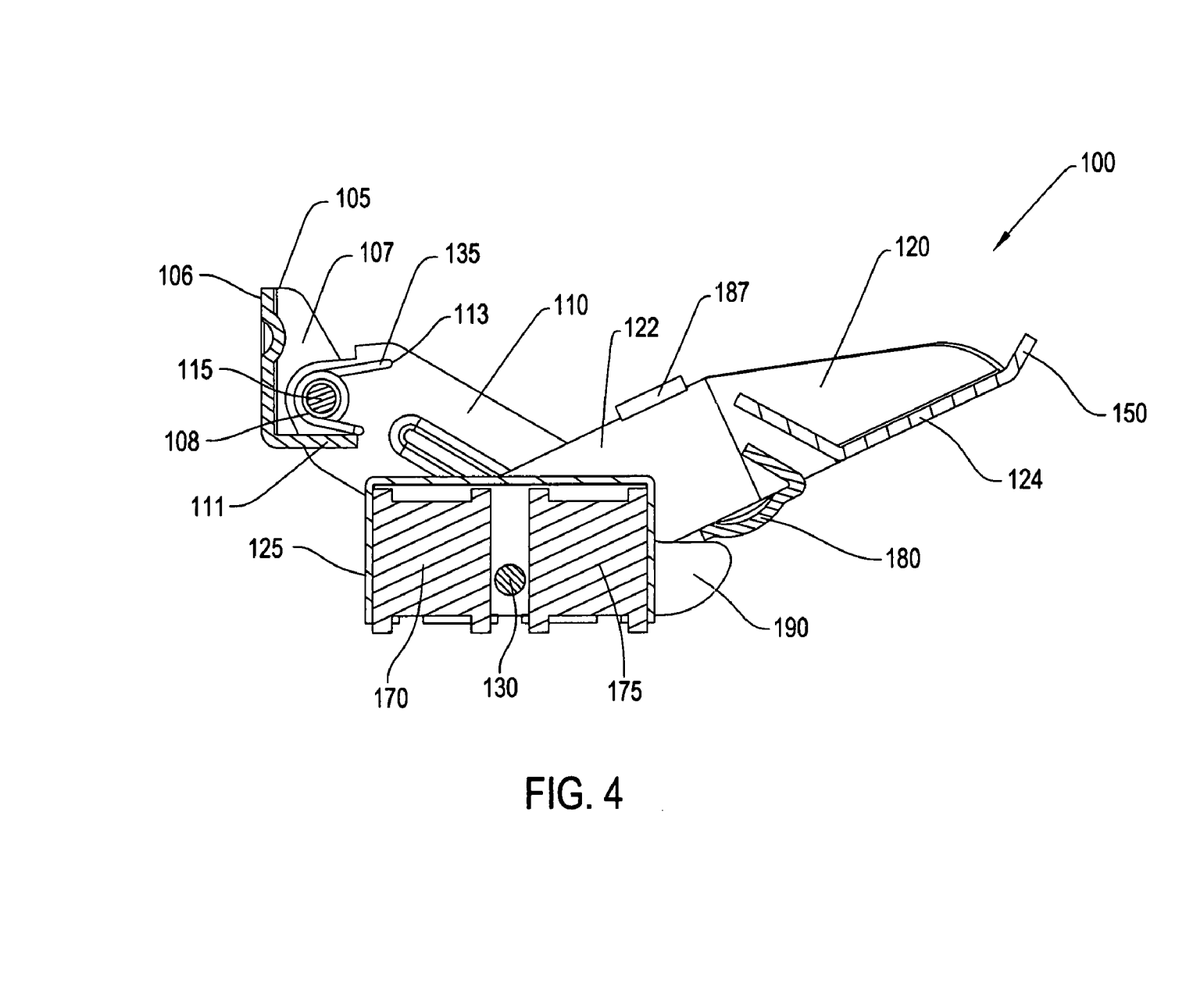
FIG. 4 is a cross-sectional view of the magnetic stabilizer taken through line 4-4 of FIG. 3.
Figure 8:
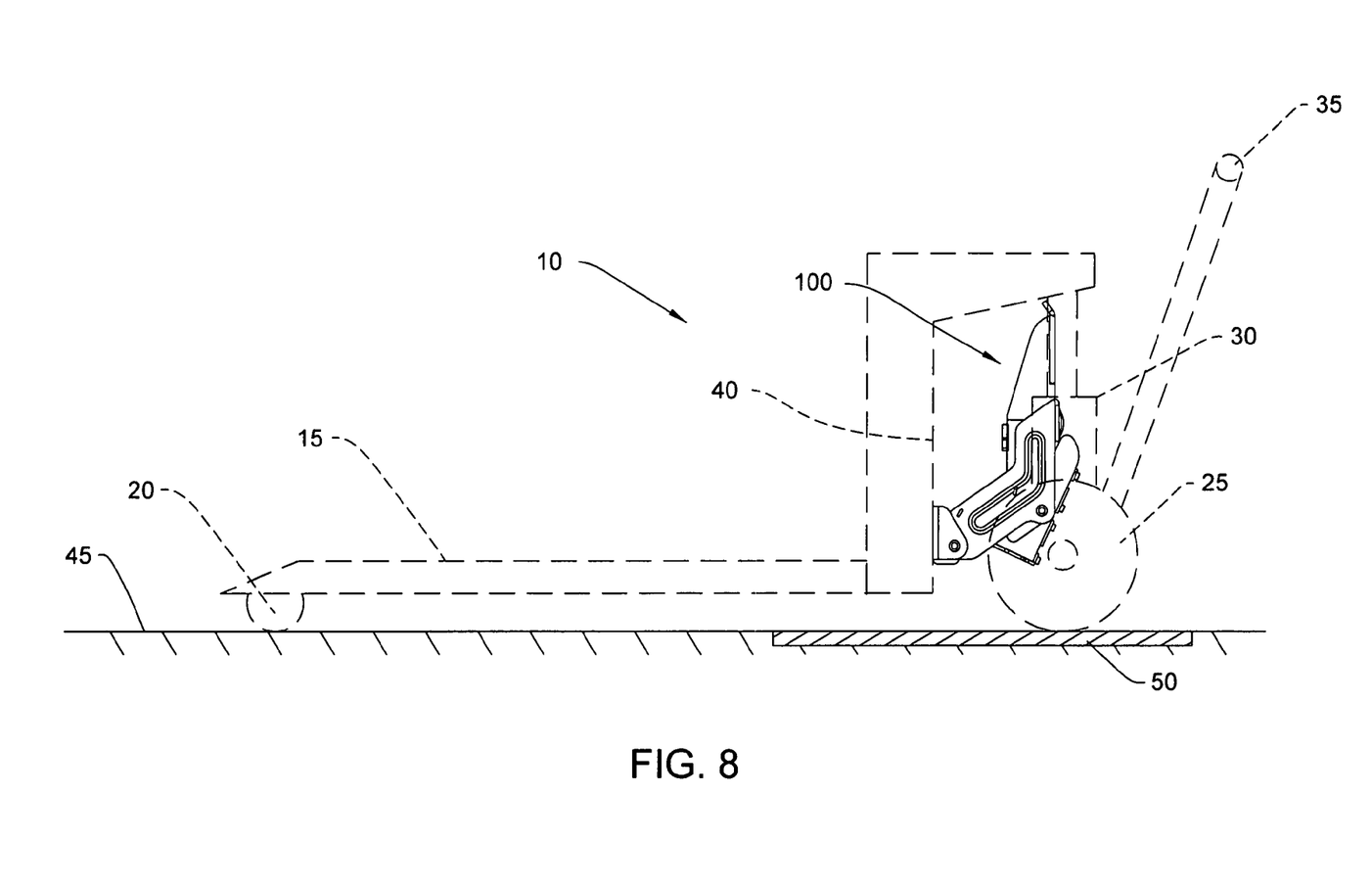
FIG. 8 is a side view of the magnetic stabilizer of FIGS. 1-7 mounted on a pallet jack and in a retracted storage position.

Referring to FIGS. 3 and 4, a pair of main frame positioning springs 135, 140 are mounted on the frame mount pin 115. The springs 135, 140 are illustrated as torsion springs that engage a lower leg 111 of the frame mount 105, and an aperture 113 in the main frame 110. The springs 135, 140 have one end engaged in the apertures 113 and bear against the lower leg 111, thereby biasing the main frame 110 in an upward or counterclockwise direction (as seen in FIGS. 2 and 8) to a storage position. Other forms of biasing member would also be acceptable to perform this function. The springs 135, 140 also permit downward or clockwise swinging of the main frame 10 to the anchoring position.

The release lever 120, as particularly shown in FIGS. 3-7, includes two legs 122, 123 connected by a plate 124. The release lever 120 further has a first, user-engageable end 150 formed by the plate 124. Second, floor-engaging ends 155 (FIGS. 2 and 7) on the legs 122, 123 are opposite the user-engageable end 150. The release lever 120 is carried on the main frame pin 130, which passes through an aperture 160 (FIG. 7), located substantially closer to the floor-engaging end 155, providing a substantial mechanical advantage; any force applied to the user-engageable end 150 of the release lever 120 will be multiplied so that as the floor engaging ends 155 contact the floor, the greater force will enable a "prying off", as will be discussed further below.

The magnet housing 125 houses permanent magnets 170, 175 that are adapted to engage a metallic floor surface 45 to anchor the stabilizer 100 and associated pallet jack 10 in a fixed position. While the springs 135, 140 continue to generate an upward biasing force on the main frame 110, the magnetic attraction or engagement of the magnets 170, 175 to the floor surface 45 holds the main frame 110 in the anchoring position.

A torsion spring 145 mounted on the main frame pin 130 is engaged between the main frame 110 and the release lever 120. One end of the torsion spring 145 extends through the side of the main frame 110, while the other end of the spring 145 engages a tab 146 extending from one leg 123 of the release lever 120. In this manner, the torsion spring 145 biases the release lever 120 against a bridge portion 180 of the main frame 110. When the magnetic stabilizer 100 is in the raised or storage position (FIG. 8), the torsion spring 145 thereby prevents the release lever 120 from falling backward against the rearward frame portion 40 of the pallet jack 10. The user-engageable end 150 of the release lever 120 is thereby readily accessed by the user to permit prying off of the magnets 170, 175 from the floor surface 45. Wings 185, 187 extend from the release lever 120 to engage the sides of the main frame 110 during a release operation, as will be discussed below.

OPERATION

The magnetic housing 125 includes an arcuate toe portion 190 extending outwardly from the magnetic housing 125 and away from the frame mount 105. The magnetic housing 125 is pivotally connected to the main frame 110 and the release lever 120 about the main frame pin 130, but is not substantially restricted from rotational movement. It is possible that as the main frame 110 and its release lever 120 are rotated together about the frame mount 115, from the storage or disengaged position (FIG. 8) to the in-use engaged position (FIG. 1), the magnetic housing 125 might approach the floor surface in an attitude such that the engaging surfaces of the magnets 170, 175 are not parallel with the floor surface 45.

The arcuate toe portion 190 of the magnet housing 125 is constructed so that if the magnet housing 125 approaches the floor surface in a "nose down" position, the arcuate toe portion 190 engages the floor surface first, and smoothly slides on the floor surface to direct the magnet housing 125 to rotate in a counterclockwise direction until the permanent magnets 170, 175 are parallel with the floor surface to magnetically engage same. The magnet housing 125 is prevented from over rotating in the clockwise direction by a pair of stops 195 (FIGS. 5-6) extending laterally from the magnet housing 125 in a position to engage the main frame 110. Over-rotation in the counterclockwise direction is prevented by engagement of the arcuate toe portion 190 with the bridge portion 180 of the main frame 110.

During use of the pallet jack 10, the magnetic stabilizer 100 is biased by the torsion springs 135, 140 in a counterclockwise direction (FIGS. 1, 2, 4 and 8), so as to normally be raised off of the floor surface and suspended adjacent the rearward portion 40 of the pallet jack 10 (FIG. 8). This permits typical use of the pallet jack 10.

To secure or anchor the pallet jack 10, the user engages the magnetic stabilizer 100 with the floor surface 45 and the metallic plate 50 thereof. In this regard, the release lever 120 is biased in the clockwise direction by the torsion spring 145, to keep the release lever away from the rearward frame portion 40 of the pallet jack 10, readily accessible by the user. The user engages the magnetic stabilizer 100 by placing a foot on the accessible user-engageable end 150 of the release lever 120 and pressing downwardly. The release lever 120 engages the bridge portion 180 of the main frame 110 to limit rotation of the release lever 120, and thereby rotate the main frame 110 to about the frame mount pin 115 and direct the magnet housing 125 towards the floor surface 45. As the magnet housing 125 approaches the floor surface, the permanent magnets 170, 175 overcome the force of the torsion springs 135, 140 to engage the floor surface 45 and metal floor plate 50 thereof. The user can release the user-engageable end 150 of the release lever 120 when the permanent magnets 170, 175 have engaged the metal floor plate 50 or a metal floor surface to magnetically hold the main frame 110 in the engaged position, fixing or anchoring the pallet jack 10 in position on the floor surface 45.

When the user wishes to again move the pallet jack 10 for loading and unloading of various articles, the magnetic stabilizer 100 must be released. In order to disengage the magnetic stabilizer 100 from the metallic floor surface 45, the user-engageable end 150 of the release lever 120 must be lifted, or rotated about main frame pin 130 so that the floor-engaging end 155 of the release lever 120 engages the floor surface. The permanent magnets 170, 175 can then be effectively pried from the floor surface due to the mechanical advantage of the release lever 120. In practical use, the user-engageable end 150 of the release lever 120 can be kicked by the user to dislodge the magnetic stabilizer 100 from the floor surface. Over-rotation of the release lever 120 is prevented by the wings 185, 187, which can engage the sides of the main frame 110 to prevent such over-rotation. The biasing force of the springs 135, 140 then automatically return the stabilizer 100 to the storage position.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A stabilizer for material handling equipment, comprising:
   a base mount having a back plate for mounting to the material handling equipment, and extending ears each having an aperture for receiving a base mount pivot pin;
   a main frame pivotally attached to the base mount by the base mount pivot pin, the main frame including first and second arms connected by a bridge portion, the first and second arms being pivotally attached to the base mount, each of the first and second arms further including a centrally positioned aperture, a main frame pivot pin passing through each centrally positioned aperture;
   a release lever having first and second legs each including an offset aperture therethrough, the release lever being pivotally attached to the main frame by the main frame pivot pin passing through each offset aperture, each of the legs including a floor-engaging end and being connected distally of said floor-engaging end to a plate defining a user-engageable end of the release lever; and
   a magnet connected to the main frame;
   wherein the main frame is biased upwardly by a main frame positioning spring; and
   wherein the main frame positioning spring is a torsion spring carried on the base mount pivot pin.

2. The stabilizer according to claim 1, wherein the offset aperture is positioned closer to the floor-engaging end than to the user-engageable end to provide a mechanical advantage.

3. A stabilizer for material handling equipment, comprising:
   a base mount having a back plate for mounting to the material handling equipment, and extending ears each having an aperture for receiving a base mount pivot pin;
   a main frame pivotally attached to the base mount by the base mount pivot pin, the main frame including first and second arms connected by a bridge portion, the first and second arms being pivotally attached to the base mount, each of the first and second arms further including a centrally positioned aperture, a main frame pivot pin passing through each centrally positioned aperture;
   a release lever having first and second legs each including an offset aperture therethrough, the release lever being pivotally attached to the main frame by the main frame pivot pin passing through each offset aperture, each of the legs including a floor-engaging end and being connected distally of said floor-engaging end to a plate defining a user-engageable end of the release lever; and
   a magnet connected to the main frame;
   wherein the release lever is biased against the bridge portion by a release lever positioning spring; and
   wherein the release lever positioning spring is a torsion spring carried on the main frame pivot pin.

4. A stabilizer for material handling equipment, comprising:
   a base mount having a back plate for mounting to the material handling equipment, and extending ears each having an aperture for receiving a base mount pivot pin;
   a main frame pivotally attached to the base mount by the base mount pivot pin, the main frame including first and second arms connected by a bridge portion, the first and second arms being pivotally attached to the base mount, each of the first and second arms further including a centrally positioned aperture, a main frame pivot pin passing through each centrally positioned aperture;
   a release lever having first and second legs each including an offset aperture therethrough, the release lever being pivotally attached to the main frame by the main frame pivot pin passing through each offset aperture, each of the legs including a floor-engaging end and being connected distally of said floor-engaging end to a plate defining a user-engageable end of the release lever; and
   a magnet connected to the main frame;
   wherein the magnet is supported by a housing pivotally connected to the main frame by the main frame pivot pin.

5. The stabilizer according to claim 4, wherein the housing includes an arcuate nose portion.

6. A position anchoring device for portable equipment, comprising:
   a base for mounting to the portable equipment;
   a frame pivotally attached to the base; and
   a lever and housing mounted to the frame, wherein the housing includes an anchoring element for engaging a floor surface, the lever engages the frame in a first, engagement direction and is configured to engage the floor surface in a second, disengagement direction, away from the floor surface;
   wherein the lever is pivotally mounted relative to the housing and is configured to engage the floor surface for levering the anchoring element away from the floor surface.

7. The device of claim 6, wherein the anchoring element comprises at least one magnet for engaging a metallic portion of the floor surface.

8. The device of claim 6, further comprising a means for biasing the frame in the disengagement direction.

9. The device of claim 6, further comprising a means for biasing the lever in the engagement direction.

* * * * *